United States Patent
Zhao et al.

(10) Patent No.: US 10,212,409 B2
(45) Date of Patent: Feb. 19, 2019

(54) METHOD, APPARATUS, AND NON-TRANSITORY COMPUTER READABLE MEDIUM FOR GENERATING DEPTH MAPS

(71) Applicant: BOE TECHNOLOGY GROUP CO., LTD, Beijing (CN)

(72) Inventors: Xingxing Zhao, Beijing (CN); Jibo Zhao, Beijing (CN)

(73) Assignee: BOE TECHNOLOGY GROUP CO., LTD, Beijing (CN)

( * ) Notice: Subject to any disclaimer, the term of this patent is extended or adjusted under 35 U.S.C. 154(b) by 97 days.

(21) Appl. No.: 15/324,766

(22) PCT Filed: Dec. 18, 2015

(86) PCT No.: PCT/CN2015/097882
§ 371 (c)(1),
(2) Date: Jan. 9, 2017

(87) PCT Pub. No.: WO2017/101108
PCT Pub. Date: Jun. 22, 2017

(65) Prior Publication Data
US 2018/0184065 A1    Jun. 28, 2018

(51) Int. Cl.
*H04N 13/128* (2018.01)
*H04N 13/271* (2018.01)
(Continued)

(52) U.S. Cl.
CPC ............. *H04N 13/128* (2018.05); *G06F 3/01* (2013.01); *H04N 13/139* (2018.05); *H04N 13/271* (2018.05); *H04N 2013/0081* (2013.01)

(58) Field of Classification Search
CPC ............. H04N 13/128; H04N 13/0271; H04N 13/007; H04N 13/0059; H04N 13/178;
(Continued)

(56) References Cited

U.S. PATENT DOCUMENTS

| 8,644,596 | B1 * | 2/2014 | Wu | ................... | G06K 9/00201 |
| | | | | | 382/154 |
| 2007/0279412 | A1 * | 12/2007 | Davidson | ............. | H04N 13/261 |
| | | | | | 345/419 |

(Continued)

FOREIGN PATENT DOCUMENTS

| CN | 102487447 A | 6/2012 |
| CN | 102867288 A | 1/2013 |

(Continued)

OTHER PUBLICATIONS

The World Intellectual Property Organization (WIPO) International Search Report for PCT/CN2015/097882 dated Sep. 6, 2016 p. 1-12.
(Continued)

*Primary Examiner* — Jingge Wu
(74) *Attorney, Agent, or Firm* — Anova Law Group, PLLC (57) ABSTRACT

The present invention provides a depth generation method. The method includes obtaining a left two-dimensional (2D) image and a right two-dimensional image, each having a first image resolution; scaling the left 2D image and the right 2D image to obtain a scaled left 2D image and a scaled right 2D image, each having a second image resolution; and generating an output depth map based on the scaled left 2D image and the scaled right 2D image.

15 Claims, 5 Drawing Sheets

(51) Int. Cl.
*H04N 13/139* (2018.01)
*G06F 3/01* (2006.01)
*H04N 13/00* (2018.01)

(58) Field of Classification Search
CPC ............. H04N 13/0048; H04N 13/183; H04N 13/122; H04N 13/361; H04N 13/0029; H04N 13/139; H04N 13/271; H04N 13/0022; H04N 2213/003; H04N 2213/005; G06T 2207/20228; G06T 3/40
See application file for complete search history.

(56) References Cited

U.S. PATENT DOCUMENTS

| | | | | |
|---|---|---|---|---|
| 2010/0045780 A1* | 2/2010 | Kwon | ................ | H04N 13/0048 348/51 |
| 2010/0103249 A1* | 4/2010 | Lipton | .................... | G06T 15/00 348/51 |
| 2010/0309287 A1 | 12/2010 | Rodriguez | | |
| 2011/0063422 A1* | 3/2011 | Yoo | .................... | H04N 5/44543 348/54 |
| 2011/0298795 A1* | 12/2011 | Van Der Heijden | ........................ | H04N 13/111 345/419 |
| 2011/0304691 A1* | 12/2011 | Newton | ............. | H04N 13/0018 348/43 |
| 2012/0038625 A1* | 2/2012 | Kim | .................... | G06F 3/04815 345/419 |
| 2012/0162364 A1 | 6/2012 | Ferguson | | |
| 2012/0236114 A1 | 9/2012 | Chang | | |
| 2012/0327198 A1* | 12/2012 | Tsukagoshi | ........ | H04N 13/0011 348/51 |
| 2013/0011046 A1* | 1/2013 | Choi | .................... | G06T 3/4007 382/154 |
| 2013/0135435 A1* | 5/2013 | D'Amato | ............ | H04N 13/183 348/43 |
| 2013/0142415 A1 | 6/2013 | Ali et al. | | |
| 2013/0162912 A1 | 6/2013 | Chang | | |
| 2014/0085436 A1* | 3/2014 | Page | .................... | G02B 26/126 348/54 |
| 2014/0198977 A1* | 7/2014 | Narasimha | .............. | G06T 5/007 382/154 |
| 2014/0232820 A1* | 8/2014 | Ha | ............................ | G06T 3/40 348/43 |
| 2016/0044252 A1* | 2/2016 | Molina | ................ | H04N 5/2258 348/208.6 |

FOREIGN PATENT DOCUMENTS

CN 103139469 A 6/2013
WO 2013191689 A1 12/2013

OTHER PUBLICATIONS

State Intellectual Property Office of the P.R.C (SIPO) Office Action 1 for 2015800026235 dated May 12, 2017 12 Pages.

* cited by examiner

METHOD, APPARATUS, AND NON-TRANSITORY COMPUTER READABLE MEDIUM FOR GENERATING DEPTH MAPS

This PCT patent application is a national phase entry under 35 U.S.C. § 371 of International Application No, PCT/CN2015/097882, filed on Dec. 18, 2015, the entire content of which is incorporated by reference herein.

FIELD OF THE DISCLOSURE

The present disclosure relates to the field of imaging technologies and, more particularly, relates to a method, apparatus and non-transitory computer readable medium for generating depth maps.

BACKGROUND

Three-dimension (3D) image capture and display technologies have been widely used in various applications, such as 3D movies, object recognition, etc. Stereoscopic images captured by a stereo camera may include a pair of left image and right image taken at two view points at a same scene. A depth map may be extracted from a pair of images based on their image disparity. The depth map is an image or image channel that contains information relating to the distance of the surfaces of the objects from a viewpoint. A depth map may be a grey scale image. The intensity of a pixel in the depth map indicates its distance from the camera. The pixel representing the largest image disparity may indicate the minimum measurable distance from the camera.

When generating a depth map, existing implementations often search for matching pixels in a stereo image pair and calculate their parallax by a fixed-scale processing. However, once the parameters of stereo camera are fixed and the resolution of the depth map is determined, the minimum measurable distance in the generated depth map cannot be changed and the measurement resolution of the depth map is fixed.

The disclosed method and system are directed to solve one or more problems set forth above and other problems.

BRIEF SUMMARY OF THE DISCLOSURE

One aspect of the present disclosure provides depth generation method. The method includes obtaining a left two-dimensional (2D) image and a right two-dimensional image, each having a first image resolution; scaling the left 2D image and the right 2D image to obtain a scaled left 2D image and a scaled right 2D image, each having a second image resolution; and generating an output depth map based on the scaled left 2D image and the scaled right 2D image.

The method may further include adjusting the generated depth map to a third image resolution; and outputting the adjusted depth map.

The method may further include generating an intermediate depth map based on the left 2D image and the right 2D image; obtaining a depth of a target object based on the intermediate depth map; and determining the second image resolution corresponding to the depth of the target object based on the intermediate depth map.

Further, a plurality of image resolutions may be corresponded to a plurality of depth ranges. The plurality of depth ranges may include a short distance range, an intermediate distance range, and a long distance range. A depth range of the target object may be determined according to the depth of the target object. The second image resolution may be determined based on an image resolution corresponding to the depth range of the target object.

When generating a depth map, matching pixels in the scaled left 2D image and the scaled right 2D image may be identified using parallel processing at a fixed calculation scale. The calculation scale may refer to the number of pixels that can be matched at a same time. Parallax values of the matched pixels may be calculated. Intensity levels may be assigned to the depth map according to the calculated parallax values.

The method may further include generating an intermediate depth map based on the left 2D image and the right 2D image; determining the effective measurable depth range of the intermediate depth map; and determining the second image resolution based on the effective measurable depth range of the intermediate depth map. An effective measurable depth refers to a depth with corresponding measurement resolution greater than or equal to a threshold.

Another aspect of the present disclosure provides a depth generation apparatus. The apparatus may include an image acquisition module configured to obtain a left two-dimensional (2D) image and a right 2D image, each having a first image resolution; an image resolution adjusting module configured to scale the left 2D image and the right 2D image to obtain a scaled left 2D image and a scaled right 2D image, each having a second image resolution; and a depth map generation module configured to generate an output depth map based on the scaled left 2D image and the scaled right 2D image.

The apparatus may further include a depth map resolution adjusting module configured to adjust the generated depth map to a third image resolution and output the adjusted depth map.

The depth map generation module may be further configured to generate an intermediate depth map based on the left 2D image and the right 2D image. The apparatus may further include a resolution control module configured to obtain a depth of a target object based on the intermediate depth map; and to determine the second image resolution corresponding to the depth of the target object based on the intermediate depth map.

The resolution control module is further configured to correspond a plurality of image resolutions to a plurality of depth ranges; determine a depth range of the target object according to the depth of the target object; and determine the second image resolution based on an image resolution corresponding to the depth range of the target object. The plurality of depth ranges may include a short distance range, an intermediate distance range, and a long distance range.

Further, the depth map generation module may be configured to identify matching pixels in the scaled left 2D image and the scaled right 2D image by parallel processing at a calculation scale; calculate parallax values of the matched pixels; and assign intensity levels to the depth map according to the calculated parallax values. The calculation scale may refer to a number of pixels that can be matched at a same time.

Further, the depth map generation module may be configured to generate an intermediate depth map based on the left 2D image and the right 2D image. The apparatus may further a resolution control module configured to determining the effective measurable depth range of the intermediate depth map, and to determine the second image resolution based on an effective measurable depth range. An effective measurable depth refers to a depth with corresponding measurement resolution greater than or equal to a threshold.

Another aspect of the present disclosure provides a non-transitory computer-readable medium having computer programs for, when being executed by a processor, performing a depth map generation method. The method may include obtaining a left two-dimensional (2D) image and a right two-dimensional image, each having a first image resolution; scaling the left 2D image and the right 2D image to obtain a scaled left 2D image and a scaled right 2D image, each having a second image resolution; and generating an output depth map based on the scaled left 2D image and the scaled right 2D image.

The method performed by the computer programs in the non-transitory computer-readable medium may further include adjusting the generated depth map to a third image resolution; and outputting the scaled depth map.

The method performed by the computer programs in the non-transitory computer-readable medium may further include generating an intermediate depth map based on the left 2D image and the right 2D image; obtaining a depth of a target object based on the intermediate depth map; and determining the second image resolution corresponding to the depth of the target object based on the intermediate depth map.

Further, a plurality of image resolutions may be corresponded to a plurality of depth ranges. The plurality of depth ranges may include a short distance range, an intermediate distance range, and a long distance range. A depth range of the target object may be determined according to the depth of the target object. The second image resolution may be determined based on an image resolution corresponding to the depth range of the target object.

When generating a depth map, matching pixels in the scaled left 2D image and the scaled right 2D image may be identified using parallel processing at a fixed calculation scale. The calculation scale may refer to the number of pixels that can be matched at a same time. Parallax values of the matched pixels may be calculated. Intensity levels may be assigned to the depth map according to the calculated parallax values.

The method performed by the computer programs in the non-transitory computer-readable medium may further include generating an intermediate depth map based on the left 2D image and the right 2D image; determining the effective measurable depth range of the intermediate depth map; and determining the second image resolution based on the effective measurable depth range of the intermediate depth map. An effective measurable depth refers to a depth with corresponding measurement resolution greater than or equal to a threshold.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Hereinafter, embodiments according to the disclosure will be described with reference to the drawings. Wherever possible, the same reference numbers will be used throughout the drawings to refer to the same or like parts. It is apparent that the described embodiments are some but not all of the embodiments of the present invention. Based on the disclosed embodiments, persons of ordinary skill in the art may derive other embodiments according to the present disclosure, all of which are within the scope of the present invention.

Figure 1:
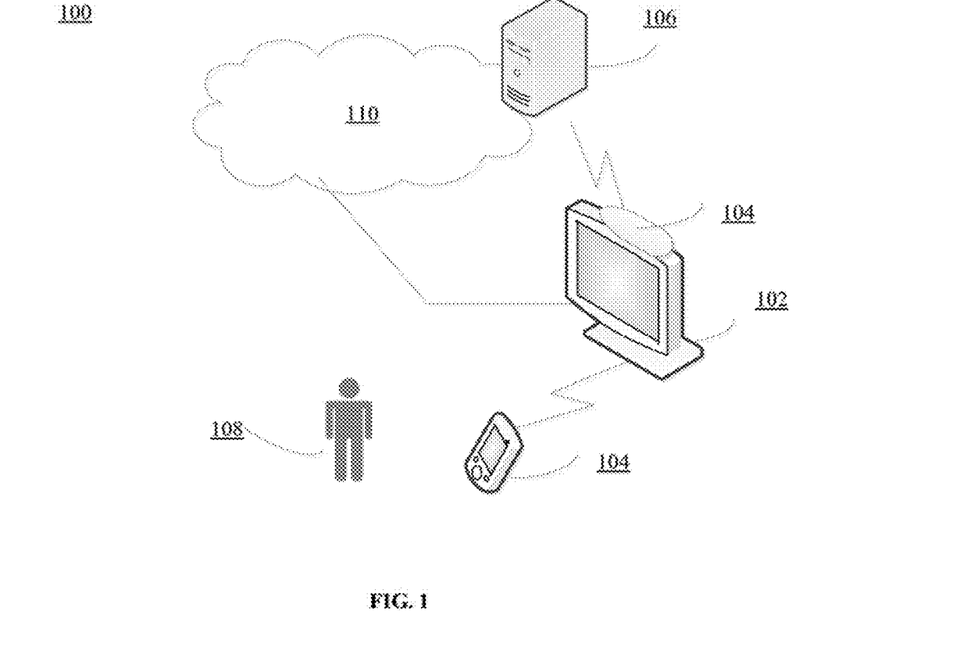
FIG. 1 illustrates an exemplary environment incorporating various embodiments of the present disclosure.

FIG. 1 illustrates an exemplary environment 100 incorporating various embodiments of the present disclosure. As shown in FIG. 1, environment 100 may include a television set (TV) 102, a remote control 104, a server 106, a user 108, and a network 110. Certain devices may be omitted and other devices may be included to better describe the embodiments.

TV 102 may include any appropriate type of display devices, such as a plasma TV, a liquid crystal display (LCD) TV, a touch screen TV, a projection TV, a smart TV, etc. TV 102 may also include other computing systems, such as a personal computer (PC), a tablet or mobile computer, or a smart phone, etc. Further, TV 102 may be capable of implementing 3D displays. TV 102 may incorporate any appropriate type of display modalities to create stereoscopic display effect, such as shutter glasses, polarization glasses, anaglyphic glasses, etc. In certain embodiments, TV 102 may implement naked-eye 3D display technologies.

The remote control 104 may include any appropriate type of remote control that communicates with and controls TV 102, such as a customized TV remote control, a universal remote control, a tablet computer, a smart phone, or any other computing device capable of performing remote control functions. The remote control 104 may also include other types of devices, such as a motion-sensor based remote control, or a depth-camera enhanced remote control, as well as simple input/output devices such as a keyboard, a mouse, and a voice-activated input device, etc.

The remote control 104 may include any appropriate type of sensors that detects input from user 108 and communicates with TV 102, such as a body temperature sensor, a motion sensor, a microphone, a camera, etc. Remote control 104 may be imbedded in TV 102 or separated from TV 102. In an exemplary embodiment, the remote control 104 may include a stereoscopic camera that captures a 3D scene with depth information and tracks gestures and/or motions of user 108.

User 108 may interact with TV 102 using remote control 104 to watch various programs and perform other activities of interest. The user may simply use hand or body gestures to control TV 102. If TV 102 is a touch screen TV, the user 108 may also interact with TV 102 by contacts or hand gestures. The user 108 may be a single user or a plurality of users, such as family members watching TV programs together.

Further, the server 106 may include any appropriate type of server computer or a plurality of server computers for providing video contents to the user 108. The server 106 may also facilitate communication, data storage, and data processing between the remote control 104 and TV 102. TV 102, remote control 104, and server 106 may communicate with each other through one or more communication networks 110, such as a cable network, a phone network, a wireless network, and/or a satellite network, etc. The network 110 may include any number of communication networks and servers for providing various media for the server 106, such as streaming 3D videos, providing stereo images, etc.

Figure 2:
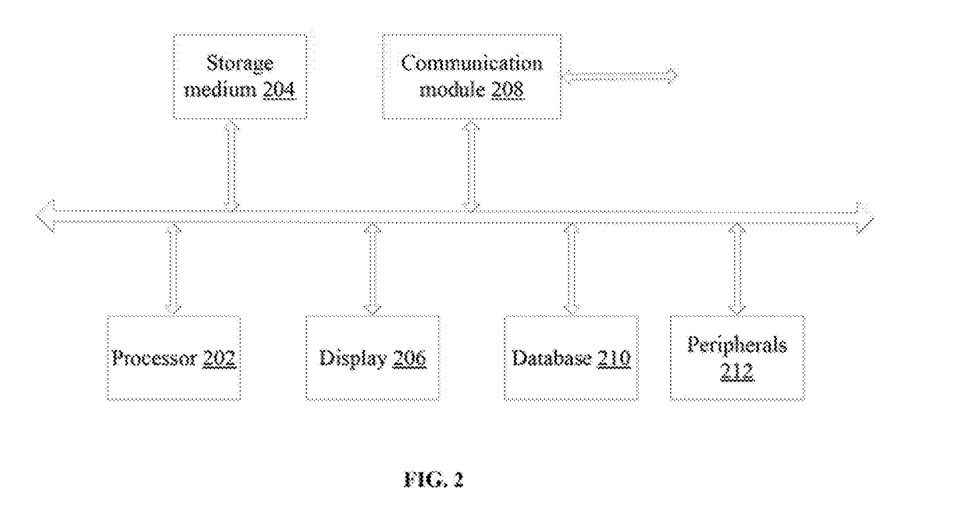
FIG. 2 illustrates an exemplary computing system according to various embodiments of the present disclosure.

TV 102, remote control 104 and/or server 106 may be implemented on any appropriate computing circuitry platform. In operation, the computing circuitry platform may obtain stereoscopic images and generate a depth map based on the stereoscopic images. The generated depth map may be utilized in various applications, such as detecting body gestures, present virtual contents with 3D display effects, etc. FIG. 2 shows a block diagram of an exemplary computing system 200 that can be used to realize TV 102, remote control 104 and/or server 106.

As shown in FIG. 2, computing system 200 may include a processor 202, a storage medium 204, a display 206, a communication module 208, a database 210 and peripherals 212. Certain devices may be omitted and other devices may be included to better describe the relevant embodiments.

Processor 202 may include any appropriate processor or processors. Further, processor 202 can include multiple cores for multi-thread or parallel processing. Processor 202 may execute sequences of computer program instructions to perform various processes. Storage medium 204 may include memory modules, such as ROM, RAM, flash memory modules, and mass storages, such as CD-ROM and hard disk, etc.

Storage medium 204 may store computer programs for implementing various processes when the computer programs are executed by processor 202, such as computer programs for rendering graphics for a user interface, implementing a face recognition or gesture recognition process, etc. Storage medium 204 may store computer instructions that, when executed by the processor 202, cause the processor to generate a depth map from stereoscopic images. The computer instructions can be organized into modules to implement various calculations and functions as described in the present disclosure.

Further, communication module 208 may include certain network interface devices for establishing connections through communication networks. Database 210 may include one or more databases for storing certain data and for performing certain operations on the stored data, such as database searching. Further, the database 210 may store images, videos, personalized information about user 108, such as preference settings, favorite programs, user profile, etc., and other appropriate contents.

Display 206 may provide information to a user or users of TV 102. Display 206 may include any appropriate type of computer display device or electronic device display such as CRT or LCD based devices. Display 206 may also implement 3D display technologies for creating 3D display effects of input contents. Peripherals 212 may include various sensors and other I/O devices, such as body sensor, motion sensor, microphones, stereo camera, RGB camera, infrared camera, etc.

Figure 3:
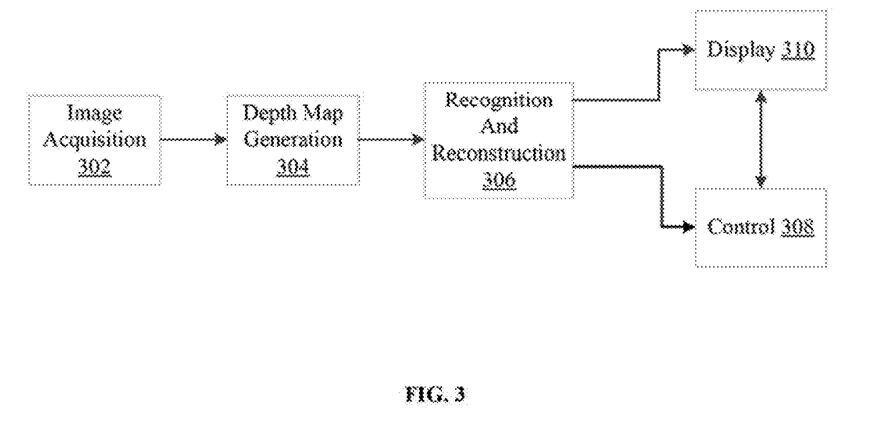
FIG. 3 illustrates a structure diagram of an exemplary system for depth map generation according to various embodiments of the present disclosure.

FIG. 3 illustrates a structure diagram of an exemplary system for generating a depth map according to various embodiments of the present disclosure. As shown in FIG. 3, an exemplary depth map generation system 300 may include an image acquisition module 302, a depth map generation apparatus 304, a recognition and reconstruction module 306, a control module 308, and a display module 310. Certain components may be omitted and other components may be included to better describe embodiments of the present disclosure.

The image acquisition module 302 may be configured to obtain left a two-dimensional (2D) image and a right 2D image from one or more sources, such as one or more RGB cameras, one or more IR cameras, data storage, online storage, etc., and send the left 2D images and the right 2D images to the depth generation apparatus 304. The left 2D image and right 2D image may have a first image resolution. In an exemplary embodiment, the image acquisition module 302 may include a stereo camera. In one example, the stereo camera may be a real world camera. In another example, the stereo camera may be a virtual camera capturing a scene in a virtual 3D space.

The stereo camera may have a plurality of lenses for capturing images. Among the plurality of lenses, one or more pairs of lenses may be identified. For example, a stereo camera may have three lenses, which means this stereo camera has three pairs of lenses. When a stereo camera take one shot of a current scene, a pair of images corresponding to one pair of lenses may be obtained. The pair of images includes a left image and a right image. Further, a pair of left and right images may be taken by two individual cameras.

For example, the stereo camera described in embodiments of the present disclosure may refer to a pair of a left camera and a right camera (e.g., a stereo camera with two lenses). It should be noted that similar method and/or apparatus embodiments may also apply to stereo cameras with more than two lenses and two or more individual cameras. Hereinafter, a pair of 2D images taken by a pair of left camera and right camera may be referred to as a stereo image pair. A stereo image pair consists of two images of the same scene, taken from slightly horizontally separated points, which are the positions of the left camera and the right camera. The two images may be referred to as a left image and a right image.

The image acquisition module 302 may be further configured to obtain camera parameters when capturing the stereo image pairs, such as the focal lengths and baseline distances. The baseline distance may refer to the distance between the left camera and the right camera.

It should be noted that the image acquisition module 302 may also be configured to obtain three-dimensional videos. The 3D videos may be divided into a plurality of frames. Each frame may correspond to a pair of left and right images.

The depth map generation apparatus 304 may be configured to scale the left 2D image and the right 2D image to obtain a scaled left 2D image and a scaled right 2D image. The scaled left 2D image and the scaled right 2D image may a second image resolution. In some embodiments, the depth map generation apparatus 304 may be further configured to crop an image to obtain a desired image resolution.

Figure 4:
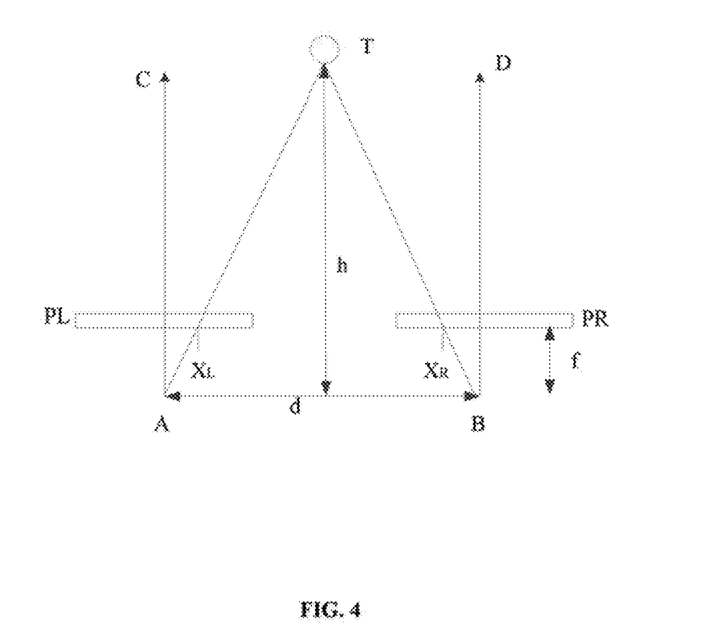
FIG. 4 illustrates principles of depth calculation according to various embodiments of the present disclosure.

Further, the depth map generation apparatus 304 may be configured to generate a depth map based on a pair of a left 2D image and a right 2D image. Further, camera parameters may be used to generate the depth map. FIG. 4 illustrates principles of depth calculation according to various embodiments of the present disclosure.

As shown in FIG. 4, a left camera and a right camera may capture a left image and a right image of a target object at position T. Position A indicates the optical center of the left camera and line AC indicates the optical axes of the left camera. Position B indicates the optical center of the right camera and line BD indicates the optical axes of the right camera. The distance between the optical centers of the left and right camera (i.e., distance between A and B) may be denoted as d. As used herein, d may also be referred to as the baseline distance. The depth of the target object T (i.e., the distance between the target object and camera) may be denoted as h. The focal length of the left and right camera may be denoted as f. That is, PL illustrates the image plane (e.g., a CCD sensor) of the left camera, and PR illustrates the image plane of the right camera. $X_L$ denotes the pixel position where the target object T projects to the image plane of the left camera, and $X_R$ denotes the pixel position where the target object T projects to the image plane of the right camera.

Further, the target object T may appear at different positions (i.e., $X_L$ and $X_R$) in the left image and the right image. The parallax may be obtained by calculating the disparity of the two positions (i.e., $\Delta x = x_R - x_L$). Objects close to the stereo camera may be placed more to the right in the left image and more to the left in the right image (i.e., greater parallax value). Faraway objects may be located at approximately the same position in both images (i.e., smaller parallax value). According to triangulation relationships in FIG. 4, equation (1) may be deduced.

$$\frac{d}{h} = \frac{(d + x_L) - x_R}{h - f} \rightarrow h = \frac{d * f}{x_R - x_L} = \frac{d * f}{\Delta x} \qquad (1)$$

Therefore, the depth of the target object may be calculated based on the parallax value and geometry of the stereo setting (e.g., camera parameters). Further, when the camera parameters are set (e.g., d and f are fixed), each depth value corresponds to one parallax value, and the depth value is inversely related with the parallax value. That is, a larger parallax value may indicate an object closer to the camera, and a smaller parallax value may indicate an object farther away from the camera. This means that once the parallax is computed, depth may in turn be found when camera parameters are given. Thus, in certain embodiments, the parallax value may be directly used to generate the depth map.

Depth maps may be stored as grayscale images that show distance instead of texture. Returning to FIG. 3, in an exemplary embodiment, one image from the stereo image pair (e.g., the left image) may be used as a reference image for producing the depth map. An intensity value may be assigned to each pixel coordinate according to the depth value. The depth map may be generated to have the same view as the reference image.

For contents depicted in both the left image and the right image, the depth map generation apparatus 304 may be configured to find a pair of matching pixels in the left image and the right image, obtain a parallax value from the matching pixel pair, and assign an intensity value based on the parallax value to a corresponding pixel in the depth map. When the left image is used as the reference image of the depth map, the corresponding pixel is at the same position as the matched pixel from the left image. When the input images are the scaled left 2D image and the scaled 2D image with the second image resolution, the depth map generation apparatus 304 may generate a depth map based on the scaled left 2D image and the scaled right 2D image. The generated depth map may have the second image resolution.

The recognition and reconstruction module 306 may be configured to recognize various subjects and reconstruct the captured scene according to the depth map. The control module 308 may be configured to perform corresponding control actions according to the recognized subjects or the reconstructed results from the recognition and reconstruction module 306. The display module 310 may be configured to display received contents and facilitate user interactions.

In certain embodiments, the image acquisition module 302 may obtain left and right image pairs of a user. According to different applications, the recognition and reconstruction module 306 may recognize subjects such as the face of the user, a position of a body part of the user, a movement performed by the user, etc. The control module 308 may be configured to perform corresponding control actions according to the recognized subjects.

In one embodiment, the system 300 may be used in an identity verification application. The recognition and reconstruction module 306 may perform face recognition of the user. The control module 308 may match user profiles with the results from the recognition and reconstruction module 306. When a match is found, the control module 308 may verify identity of the user and allow the user to access data associated with the user.

In another embodiment, the system 300 may be used in a motion detection or motion control application. The recognition and reconstruction module 306 may track physical movements of the user, such as finger movements, hand gestures, body gestures, etc., according to a plurality of depth maps. The control module 308 may execute corresponding operation commands actions based on the recognized user gesture, such as navigating a user interface, controlling a character in a video game, etc.

In certain embodiments, the system 300 may be used in a 3D scanning and 3D reconstruction application. The recognition and reconstruction module 306 may be configured to reconstruct a 3D scene based on the captured images and the depth map. Objects in the 3D scene may be recognized. The display module 310 may be further configured to apply 3D display technologies. The users may use 3D glasses or naked eyes to view the reconstructed 3D objects or reconstructed 3D scenes.

Figure 5:
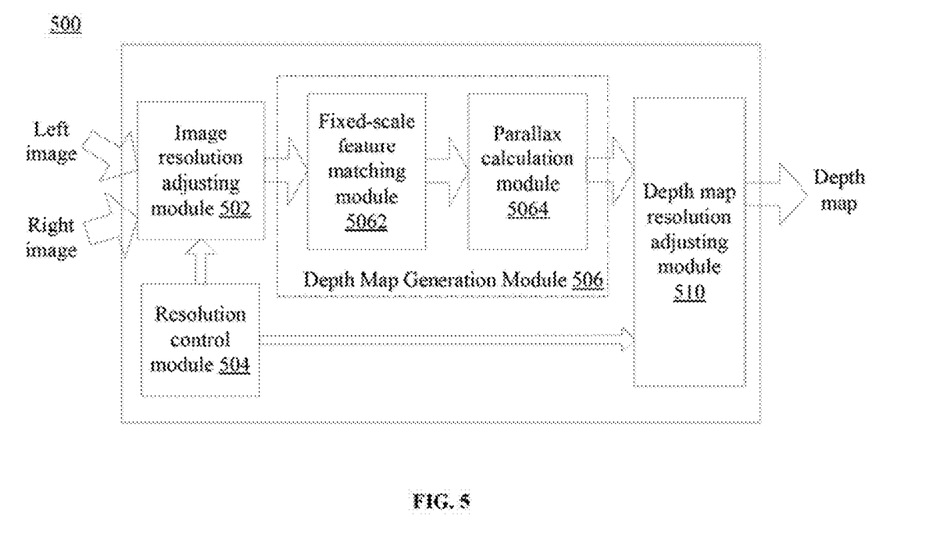
FIG. 5 illustrates a structure diagram of an exemplary apparatus for depth map generation according to various embodiments of the present disclosure.

FIG. 5 illustrates a structure diagram of an exemplary apparatus for generating depth maps according to various embodiments of the present disclosure. The depth map generation apparatus may be used as, for example, the depth map generation apparatus 304. As shown in FIG. 5, an exemplary depth map generation apparatus 500 may include an image resolution adjusting module 502, a resolution control module 504, a depth map generation module 506, and a depth map resolution adjusting module 510. Certain components may be omitted and other components may be included to better describe the embodiments.

The depth map generation apparatus 500 may further include an image acquisition module (e.g., image acquisition module 302) configured to obtain a left two-dimensional (2D) image and a right 2D image. The left 2D image and the right 2D image may have a first image resolution.

The image resolution adjusting module 502 may be configured to scale and/or crop the left 2D image and the right 2D image to a desired resolution to obtain a scaled left 2D image and a scaled right 2D image. The desired resolution may be referred to as the second image resolution. In one embodiment, the first image resolution of the pair of the left 2D image and the right 2D image may be 1280*720 pixels. The second image resolution may be QVGA (Quarter Video Graphics Array) resolution which is 320*240 pixels. The image resolution adjusting module 502 may crop the left 2D image and the right 2D image from 1280*720 pixels to 960*720 pixels and compress the cropped images from 960*720 pixels to 320*240 pixels. The second image resolution may be obtained from the resolution control module 504.

The depth map generation module 506 may be configured to generate an output depth map based on the scaled left 2D image and the scaled right 2D image. The depth map generation module 506 may further include a fixed-scale feature matching module 5062 and a parallax calculation module 5064.

The fixed-scale feature matching module 5062 may be configured to find matching pixel pairs in a pair of a left 2D image and a right 2D image. The parallax calculation module 5064 may be configured to obtain a parallax value for each matched pixel pair and calculate a depth value of a corresponding pixel in the depth map based on the parallax value.

The adjusted left and right images of a stereo pair may be respectively used as a reference image and a second image. The depth map may be generated based on the view of the reference image. For example, the left image may be used as the reference image. The generated depth map may have the same view as the left image. That is, the pixel coordinate of a target object in the left image is the same as the pixel coordinate of the target object in the depth map. The fixed-scale feature matching module 5062 may evaluate pixel similarities between a pixel in the reference image and a pixel in the second image according to one or more features. The features may include, for example, intensity differences, gradient differences, etc.

In an exemplary embodiment, the left image and the right image may be horizontally aligned. Thus, the fixed-scale feature matching module 5062 may perform a one dimensional (1-D) search along horizontal lines. The fixed-scale calculation (e.g., feature matching) may refer to the calculations in which the number of pixels processed at the same time is fixed at the processor. The calculation scale may refer to a plurality of pixels, such as 64 pixels, 128 pixels, 256 pixels, 512 pixels, etc. In certain embodiments, a computing chip having parallel processing capabilities may implement the fixed-scale feature matching process. For example, a processor may check the similarities between a pixel in the reference image and 256 pixels in the second image at the same time by parallel processing, which may be referred to as a fixed-scale of 256 pixels.

For example, when the calculation scale is 256 pixels, in operation, for a pixel P1 in the reference image, 256 pixels from a same line in the second image closest to P1's coordinate (including coordinate of P1) may be matched against P1 for feature similarities at the same time. In this case, the fixed-scale refers to the 256 pixels. One pixel P2 among the 256 pixels in the second image may have the most similar features to P1 and is determined to be the matching pixel for P1. Therefore, the matched pixel pair may be identified. This process may be repeated for all pixels in the reference image.

When a matching pixel pair is identified, the parallax calculation module 5064 may obtain a parallax value, which is the horizontal pixel distance for each image pixel coordinate (e.g., coordinate of P1 and coordinate of P2). That is, the unit of a parallax value is pixel quantity. The parallax calculation module 5064 may convert the parallax value to an intensity level for a pixel in the depth map at the same position as the pixel in the reference image. When every pixel is processed and assigned with an intensity level value, the depth map may be generated. In the previous example, when the scale of calculation is 256 pixels, the horizontal pixel distance between a matching pixel pair is from 0 to 255. That is, the depth map may have 256 intensity levels corresponding to the 256 parallax value.

The minimum measurable depth for a depth map may correspond to a point with the largest parallax value (e.g., 255 in the previous example). Further, the measurement resolution of an intensity level in the depth map may be inversely related to its measurable depth difference, which is the difference between the depth represented by the current intensity level and the depth represented by the next intensity level. For example, the measurable depth difference corresponding to one intensity level may be 0.02 m, and the resolution corresponding to the intensity level may be 50/m. It is understood that the measurement resolutions for closer objects are higher (i.e., smaller depth changes can be detected).

An effective depth measurement range may refer to the range from the minimum measurable depth to a distance where the measurement resolution reaches a preset threshold distance. When the measurable depth is greater than the threshold distance, the resolution may not be good enough to extract meaningful information from the images. Depending on the scale of the fixed-scale feature matching (e.g., 128/256/512 pixels), the resolution may improve. However, in practice, the computation resource is limited. The image processor is limited by it maximum fixed-scale calculation capacity. As such, the minimum measurement resolution of the depth map may not be enhanced indefinitely.

When the resolution of the scaled left 2D image and the scaled right 2D image (i.e., the second image resolution) is determined, with fixed-scale feature matching, the minimum measurable depth in the depth map is fixed. The effective measurement range of the depth map is also fixed. For example, given the second image resolution is 320*240 pixels, the baseline distance (i.e., d) is 12 cm and the calculation scale is 256, the resolution of the generated depth map is also 320*240 pixels and the effective measurement range of the generated depth map may be from about 0.3 m to 2.2 m.

To generate a depth map with desired and adjustable effective measurement range, the disclosed depth map generation apparatus 500 further includes a resolution control module 504 and a depth map resolution adjusting module 510. The resolution control module 504 may be configured to send control instructions to the image resolution adjusting module 502 and the depth map resolution adjusting module 510 according to desired configurations of the depth map. The desired configuration may include a desired image resolution of an output depth map. The desired image resolution of the output depth map may be referred to as the third image resolution. The desired configuration may further include a desired minimum measurable depth or a desired effective measurement range.

In an exemplary embodiment, the pair of the left 2D image and the right 2D image obtained from the image acquisition module may have a first image resolution. The resolution control module 504 may instruct the image resolution adjusting module 502 to adjust the left 2D image and the right 2D image to a second image resolution. The second image resolution may be determined according to the desired configurations of the output depth map. Further, the depth map generation module 506 may generate a depth map with the second image resolution and send to the depth map adjusting module 510. The depth map adjusting module 510 may be configured to adjust the resolution of the generated depth map to the third image resolution to produce the output depth map.

In one embodiment, the depth map generation module 506 may be further configured to generate an intermediate depth map based on the left 2D image and the right 2D image. The resolution control module 504 may be configured to obtain a depth of a target object based on the intermediate depth map; and to determine the second image resolution corresponding to the depth of the target object based on the intermediate depth map.

Further, the resolution control module 504 may correspond a plurality of image resolutions to a plurality of depth ranges. The plurality of depth ranges may include a short distance range, an intermediate distance range, and a long distance range. When the depth of the target object is obtained, the resolution control module 504 may determine a depth range of the target object according to the depth of the target object, and determine the second image resolution based on an image resolution corresponding to the depth range of the target object. For example, when the target object is in the short distance range, the resolution control module 504 may determine the second image resolution to be the image resolution corresponding to the short distance range.

Figure 6:
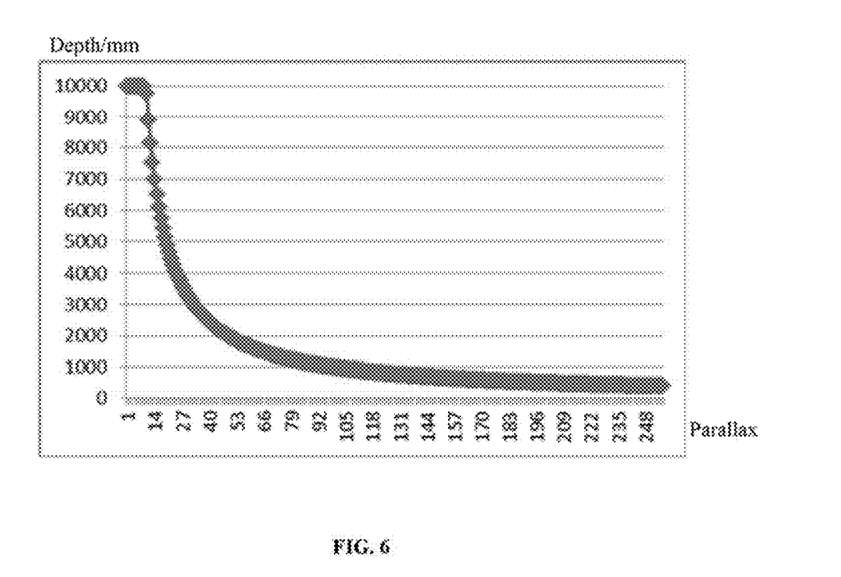
FIG. 6 illustrates a parallax-distance relationship diagram of a first output depth map according to the present disclosure.
Figure 7:
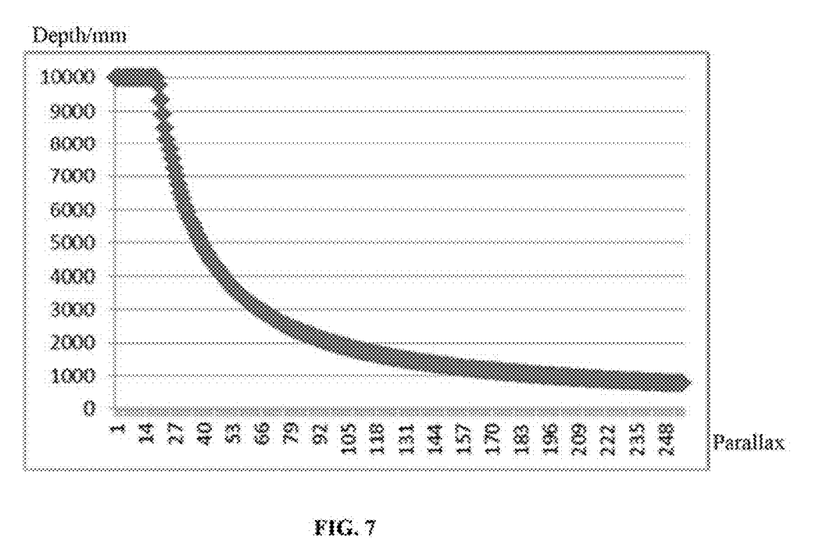
FIG. 7 illustrates a parallax-distance relationship diagram of a second output depth map according to the present disclosure.
Figure 8:
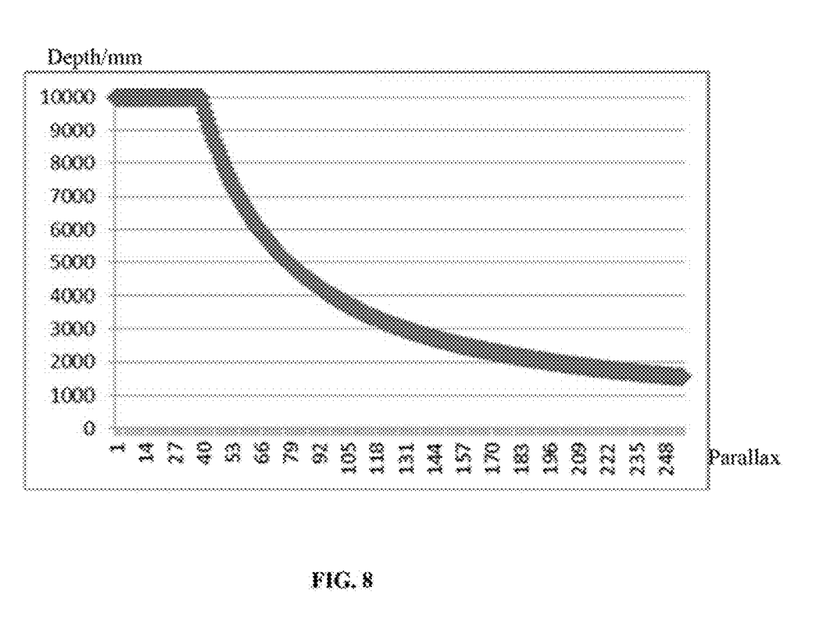
FIG. 8 illustrates a parallax-distance relationship diagram of a third output depth map according to the present disclosure.

FIGS. 6-8 illustrate three parallax-depth relationship diagrams of three output depth maps according to the present disclosure. In the three examples, the resolution of the input left 2D image and right 2D image (i.e., the first image resolution) is 1280*960 pixels, the baseline distance (i.e., d) is 12 cm, the calculation scale is 256, and the desired image resolution of the depth map (i.e., the third image resolution) is 320*240 pixels.

The x-axis denotes the parallax value, which indicates intensity levels in the depth map. The calculation scale is 256, so the range of parallax values (or intensity levels) is from 0 to 255. The y-axis denotes the depth value in units of millimeter. The range of y-axis is from 0 to 10 m. Further, when the measurement resolution of an intensity level is greater than or equal to a preset threshold (e.g., 20/m), the depth value corresponding to the intensity level is considered to be in the effective measurement range.

In a first example, the second image resolution may be 320*240 pixels. As shown in FIG. 6, the minimum measurable depth is about 382 mm. The effective measurement range of the depth map may be from about 0.3 m to 2.2 m. In this example, the second image resolution is the same as the third image resolution, thus the depth map generated from the depth map generation module 506 may be directly outputted. In certain embodiments, the effective measurement range in this example may be suitable for short distance applications.

In a second example, the second image resolution may be 640*480 pixels. As shown in FIG. 7, the minimum measurable depth is about 763 mm. The effective measurement range of the depth map may be from about 0.7 m to 3.1 m. In this example, the second image resolution is the greater than the third image resolution, thus the depth map resolution adjusting module 510 may compress the depth map from 640*480 pixels to 320*240 pixels. In certain embodiments, the effective measurement range in this example may be suitable for intermediate distance applications.

In a third example, the second image resolution may be 1280*960 pixels. As shown in FIG. 8, the minimum measurable depth is about 1528 mm. The effective measurement range of the depth map may be from about 1.5 m to 4.5 m. In this example, the first image resolution is the same as the second image resolution, thus the image resolution adjusting module 502 may send the input image pair to the depth map generation module 506 without adjustment. Further, the depth map resolution adjusting module 510 may compress the generated depth map from 1280*960 pixels to 320*240 pixels. In certain embodiments, the effective measurement range in this example may be suitable for long distance applications.

Further, in some embodiments, the resolution control module 504 may choose from a plurality of preset options to determine the second image resolution based on desired configurations of the depth map, camera parameters, and the calculation scale. For example, the preset options may include three settings: short distance, intermediate distance and long distance. Each measurement range option corresponds to a second image resolution.

In one embodiment, given that the resolution of the input image pair (i.e., the first image resolution) is 1280*960 pixels, the baseline distance (i.e., d) is 12 cm, the calculation scale is 256, and the third image resolution is 320*240 pixels, the table below shows second image resolutions corresponding to different preset options.

| Second Image Resolution | Effective Measurement Range |
| --- | --- |
| 1280 * 720 | Long distance: 1.5 m~4.5 m |
| 640 * 480 | Intermediate distance: 0.76 m~3.1 m |
| 320 * 240 | Short distance: 0.38 m~2 m |

In certain embodiments, the camera parameters (e.g., baseline distance and focal length) and the calculation scale are hardware configurations. That is, when the hardware configurations are set, the resolution control module 504 may determine the second image resolution based on the desired parameters of the depth map.

The resolution control module 504 may store a resolution table as shown above which relates to a plurality of second image resolutions to various preset options, various third image resolution corresponding to the output depth map, various hardware configurations (e.g., camera parameters and/or calculation scale). That is, given a third image resolution and a preset option of effective measurement range, the resolution control module 504 may inquire the resolution table to find the appropriate second image resolution.

For example, given the calculation scale is 256 and baseline distance is 12 cm, when the third image resolution is 320*240 pixels, and a preset option of effective measurement range is intermediate, the resolution control module 504 may determine that the second image resolution is 640*480 pixels.

In some embodiments, the resolution control module 504 may be configured to determine the second image resolution based on a desired minimum measurable depth. The resolution control module 504 may store a resolution table which relates a plurality of minimum measurable depths to various second image resolutions at given calculation scales and camera parameters. Thus, the resolution control module 504 may search the table and find a second image resolution whose corresponding minimum measurable depth is the largest among the resolutions relating to minimum measurable depths less than or equal to the desired minimum measurable depth.

Further, when the current calculation scale or camera parameters are not stored in the resolution table, the resolution control module 504 may calculate an appropriate second image resolution based on the current calculation scale and camera parameters. In an exemplary embodiment, the resolution control module 504 may identify a plurality of candidate resolutions. The candidate resolutions may have pixel dimensions in between the first image resolution and the desired image resolution of the output depth map. For example, when the first image resolution is 1280*960 pixels and the desired image resolution of the output depth map is 320*240 pixels, the candidate resolutions may be 1280*960 pixels, 640*480 pixels and 320*240 pixels.

Further, the resolution control module 504 may calculate minimum measurable depths corresponding to the candidate resolutions and compare the calculated results with the desired minimum measurable depth. In one example, the candidate resolution having the minimum measurable depth closest to the desired minimum measurable depth may be selected as the second image resolution. In another example, the candidate resolution having a minimum measurable depth being the largest among the resolutions having minimum measurable depths less than the desired minimum measurable depth may be selected as the second image resolution.

In one embodiment, the resolution control module 504 may automatically determine the second resolution. For example, the measurement range option may include three settings: a short distance range, an intermediate distance range and a long distance range. Each measurement range option may correspond to a second resolution: R1, R2, and R3. The default setting may be the intermediate distance range. In operation, the system 300 may process a first pair of left and right images based on the default setting. An intermediate depth map may be generated from the first pair of left and right images and have R2 resolution. The resolution control module 504 may automatically detect the depth of a target object according to the intermediate depth map. When the depth of the target object falls into a second range other than the default setting (e.g., a short distance range), the resolution control module 504 may determine the resolution corresponding to the second range (e.g., R1) as the second image resolution. That is, for the current and following left and right image pairs, the resolution control module 504 may instruct the image resolution adjusting module 502 to adjust them to the second image resolution.

In another example, the system 300 may use the default setting to process a plurality of left and right images captured in a predetermined time period (e.g., for the first 5 seconds, or for the first second in every 5 minutes). A plurality of depth map may be generated. Further, the resolution control module 504 may automatically calculate an averaged depth of target object. When the average depth is in a second range other than the default setting, the resolution control module 504 may determine the resolution corresponding to the second range as the second resolution.

Figure 9:
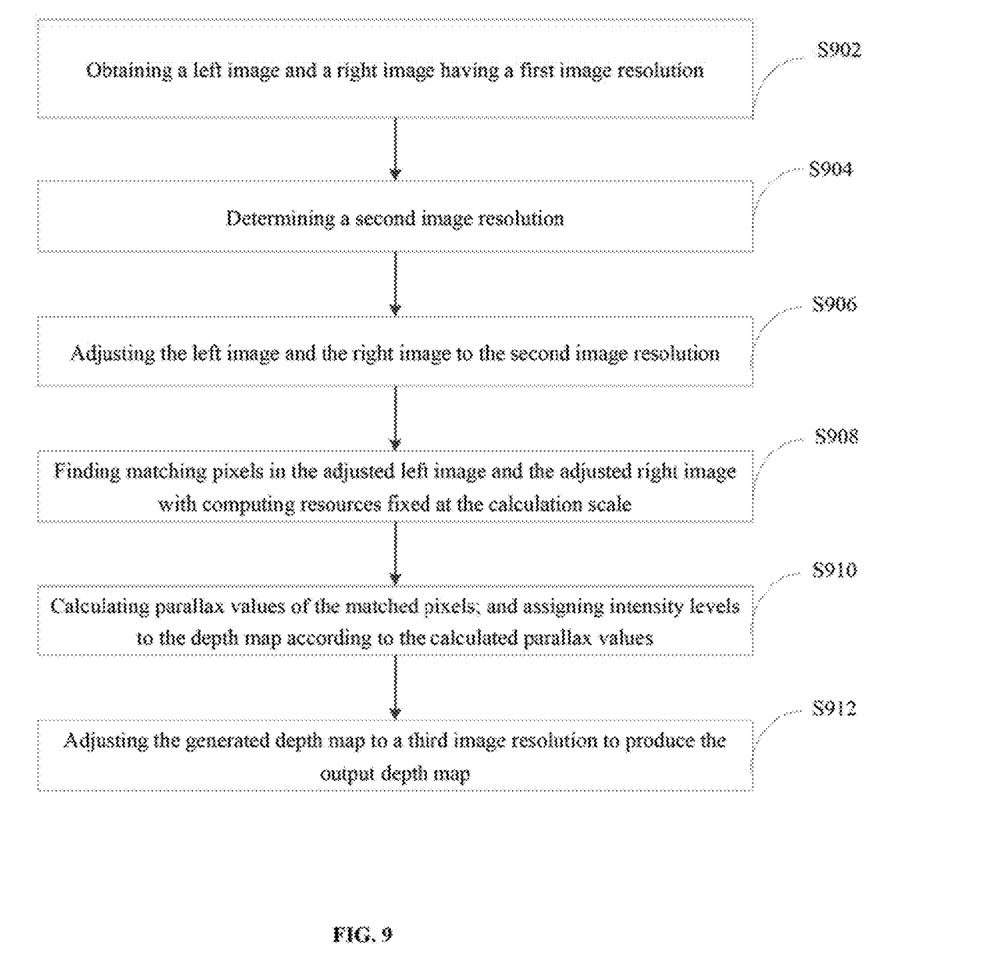
FIG. 9 illustrates a flow chart of an exemplary process for depth map generation according to the present disclosure.

FIG. 9 illustrates a flow chart of an exemplary process for depth map generation according to various embodiments of the present disclosure. As shown in FIG. 9, an exemplary depth map generation method may include the following steps.

A stereo camera may capture a pair of a left 2D image and a right 2D image having a first image resolution (S902). The stereo camera may be a real camera or a virtual camera. The camera parameters, such as the focal length and baseline distance, may also be obtained. The pair of left image and right image may be captured at slightly different horizontal positions.

The left 2D image and the right 2D image may be adjusted to the second image resolution to obtain a scaled left 2D image and a scaled right 2D image (S906).

Before step S906, the method may further include determining a second resolution (S904). The second resolution may be determined according to a preset configuration. Optionally, desired configurations of the output depth map may be identified. Based on the desired configurations of the output depth map, camera parameters and/or a calculation scale, a second image resolution may be determined. In one embodiment, the desired configurations may include a third image resolution and an effective measurable depth range. In another embodiment, the desired configurations may include a third image resolution of the output depth map and a minimum measurable depth.

Alternatively, the second image resolution may be determined automatically. For example, a plurality of image resolutions may be corresponded to a plurality of depth ranges. An intermediate depth map may be generated based on the left 2D image and the right 2D image obtained from step S902. The depth of a target object may be automatically calculated based on the intermediate depth map. The depth of a target object may belong to one of the depth ranges. The resolution corresponding to the depth range that includes the target object may be determined as the second image resolution. Further, the left 2D image and the right 2D image may be adjusted to the second image resolution.

Further, a depth map may be generated based on the scaled left 2D image and the scaled right 2D image by fixed-scale processing at the calculation scale. Specifically, when generating the depth map, fixed-scale feature matching may be performed to find matching pixels in the left image and the right image (S908). Further, the parallax value may be obtained for each matched pixel pairs. An intensity level corresponding to the parallax value may be assigned to a same pixel coordinate in the depth map. Thus, a depth map may be generated and have the second image resolution (S910).

In some embodiments, the generated depth map may be adjusted to a third image resolution to produce an output depth map (S912). Thus, the output depth map may have the desired configuration.

In certain embodiments, the stereo camera may be a real camera. A computing chip for performing the fixed-scale calculation and image resolution adjustment may be integrated with the stereo camera. That is, the camera parameters (e.g., baseline distance and focal length), the first image resolution, and the calculation scale are determined. Therefore, the second image resolution may be the one parameter that relates to the minimum measurable depth and the effective measurable depth range. With the resolution control approach, the present disclosure provides a method and apparatus that may generate a depth map with adjustable measurement resolutions.

The present disclosure provides a non-transitory computer-readable medium having computer programs for, when being executed by a processor, performing a depth map generation method. The method may include obtaining a left two-dimensional (2D) image and a right two-dimensional image, each having a first image resolution; scaling the left 2D image and the right 2D image to obtain a scaled left 2D image and a scaled right 2D image, each having a second image resolution; and generating an output depth map based on the scaled left 2D image and the scaled right 2D image.

The method performed by the computer programs in the non-transitory computer-readable medium may further include adjusting the generated depth map to a third image resolution; and outputting the scaled depth map.

The method performed by the computer programs in the non-transitory computer-readable medium may further include generating an intermediate depth map based on the left 2D image and the right 2D image; obtaining a depth of a target object based on the intermediate depth map; and determining the second image resolution corresponding to the depth of the target object based on the intermediate depth map.

Further, a plurality of image resolutions may be corresponded to a plurality of depth ranges. The plurality of depth ranges may include a short distance range, an intermediate distance range, and a long distance range. A depth range of the target object may be determined according to the depth of the target object. The second image resolution may be determined based on an image resolution corresponding to the depth range of the target object.

When generating a depth map, matching pixels in the scaled left 2D image and the scaled right 2D image may be identified using parallel processing at a fixed calculation scale. The calculation scale may refer to the number of pixels that can be matched at a same time. Parallax values of the matched pixels may be calculated. Intensity levels may be assigned to the depth map according to the calculated parallax values.

The method performed by the computer programs in the non-transitory computer-readable medium may further include generating an intermediate depth map based on the left 2D image and the right 2D image; determining the effective measurable depth range of the intermediate depth map; and determining the second image resolution based on the effective measurable depth range of the intermediate depth map. An effective measurable depth refers to a depth with corresponding measurement resolution greater than or equal to a threshold.

In various embodiments, the disclosed modules for the exemplary system as depicted above can be configured in one device or configured in multiple devices as desired. The modules disclosed herein can be integrated in one module or in multiple modules for processing messages. Each of the modules disclosed herein can be divided into one or more sub-modules, which can be recombined in any manners.

The disclosed embodiments are examples only. One of ordinary skill in the art would appreciate that suitable software and/or hardware (e.g., a universal hardware platform) may be included and used to perform the disclosed methods. For example, the disclosed embodiments can be implemented by hardware only, which alternatively can be implemented by software only or a combination of hardware and software. The software can be stored in a storage medium. The software can include suitable commands to enable any client device (e.g., including a digital camera, a smart terminal, a server, or a network device, etc.) to implement the disclosed embodiments.

Other embodiments of the disclosure will be apparent to those skilled in the art from consideration of the specification and practice of the invention disclosed herein. It is intended that the specification and examples be considered as exemplary only, with a true scope and spirit of the invention being indicated by the claims.

What is claimed is:

1. A depth map generation method implemented by a depth map generation apparatus including a depth map generation circuit, a resolution control circuit, and an image resolution adjusting circuit, the method comprising:
    obtaining, through a camera, a left two-dimensional (2D) image and a right two-dimensional image, each having a first image resolution;
    generating, through the depth map generation circuit, an intermediate depth map based on the left 2D image and the right 2D image;
    calculating, through the resolution control circuit, a depth of a target object based on the intermediate depth map;
    determining, through the resolution control circuit, a depth range of the target object according to the depth of the target object;
    determining, through the resolution control circuit, a resolution corresponding to the depth range that includes the target object, the resolution being defined as a second image resolution;
    scaling, through the image resolution adjusting circuit, the left 2D image and the right 2D image to obtain a scaled left 2D image and a scaled right 2D image, each having the second image resolution; and
    generating, through the depth map generation circuit, an output depth map based on the scaled left 2D image and the scaled right 2D image.

2. The method according to claim 1, further comprising:
    adjusting, through a depth map resolution adjusting circuit, the generated depth map to a third image resolution; and
    outputting, through the depth map resolution adjusting circuit, the scaled depth map.

3. The method according to claim 1, further comprising:
    corresponding, through the resolution control circuit, a plurality of image resolutions to a plurality of depth ranges to establish relationships between the plurality of image resolutions and the plurality of depth ranges, wherein the plurality of depth ranges include a short distance range, an intermediate distance range, and a long distance range; and
    determining, through the resolution control circuit, the depth range of the target object according to the depth of the target object and the relationships between the plurality of image resolutions and the plurality of depth ranges.

4. The method according to claim 1, wherein generating the depth map further comprises:
    identifying, through the depth map generation circuit, matching pixels in the scaled left 2D image and the scaled right 2D image using parallel processing at a fixed calculation scale, wherein the calculation scale refers to a number of pixels configured to be matched at a same time;
    calculating, through the depth map generation circuit, parallax values of the matched pixels; and
    assigning, through the depth map generation circuit, intensity levels to the depth map according to the calculated parallax values.

5. The method according to claim 1, further comprising:
    determining, through the resolution control circuit, an effective measurable depth range of the intermediate depth map, wherein the effective measurable depth refers to a depth with a corresponding measurement resolution greater than or equal to a threshold; and determining, through the resolution control circuit, the second image resolution based on the effective measurable depth range of the intermediate depth map.

6. A depth map generation apparatus, comprising:
a camera configured to obtain a left two-dimensional (2D) image and a right 2D image, each having a first image resolution;
a depth map generation circuit configured to generate an intermediate depth map based on the left 2D image and the right 2D image;
a resolution control circuit configured to calculate a depth of a target object based on the intermediate depth map, determine a depth range of the target object according to the depth of the target object, and determine a resolution corresponding to the depth range that includes the target object, the resolution being defined as a second image resolution; and
an image resolution adjusting circuit configured to scale the left 2D image and the right 2D image to obtain a scaled left 2D image and a scaled right 2D image, each having the second image resolution, wherein the depth map generation circuit is further configured to generate an output depth map based on the scaled left 2D image and the scaled right 2D image.

7. The apparatus according to claim 6, further comprises:
a depth map resolution adjusting circuit configured to adjust the generated depth map to a third image resolution and output the adjusted depth map.

8. The apparatus according to claim 6, wherein the resolution control circuit is further configured to:
correspond a plurality of image resolutions to a plurality of depth ranges to establish relationships between the plurality of image resolutions and the plurality of depth ranges, wherein the plurality of depth ranges include a short distance range, an intermediate distance range, and a long distance range; and
determine the depth range of the target object according to the depth of the target object and the relationships between the plurality of image resolutions and the plurality of depth ranges.

9. The apparatus according to claim 6, wherein the depth map generation circuit is further configured to:
identify matching pixels in the scaled left 2D image and the scaled right 2D image by parallel processing at a calculation scale, wherein the calculation scale refers to a number of pixels configured to be matched at a same time;
calculate parallax values of the matched pixels; and
assign intensity levels to the depth map according to the calculated parallax values.

10. The apparatus according to claim 6, wherein:
the resolution control circuit is configured to determine an effective measurable depth range of the intermediate depth map, and to determine the second image resolution based on the effective measurable depth range, wherein the effective measurable depth refers to a depth with a corresponding measurement resolution greater than or equal to a threshold.

11. A non-transitory computer-readable medium coupled to a processor and storing computer programs that, when being executed by the processor, cause the processor to:
obtain, through a camera, a left two-dimensional (2D) image and a right two-dimensional image, each having a first image resolution;
generate an intermediate depth map based on the left 2D image and the right 2D image;
calculate a depth of a target object based on the intermediate depth map;
determine a depth range of the target object according to the depth of the target object;
determine a resolution corresponding to the depth range that includes the target object, the resolution being defined as a second image resolution;
scale the left 2D image and the right 2D image to obtain a scaled left 2D image and a scaled right 2D image, each having the second image resolution; and
generate an output depth map based on the scaled left 2D image and the scaled right 2D image.

12. The non-transitory computer-readable medium according to claim 11, wherein the processor is caused by the executed computer programs to:
adjust the generated depth map to a third image resolution; and
output the adjusted depth map.

13. The non-transitory computer-readable medium according to claim 11, wherein the processor is caused by the executed computer programs to:
correspond a plurality of image resolutions to a plurality of depth ranges to establish relationships between the plurality of image resolutions and the plurality of depth ranges, wherein the plurality of depth ranges include a short distance range, an intermediate distance range, and a long distance range; and
determining the depth range of the target object according to the depth of the target object and the relationships between the plurality of image resolutions and the plurality of depth ranges.

14. The non-transitory computer-readable medium according to claim 11, wherein the processor is caused by the executed computer programs to:
identify matching pixels in the scaled left 2D image and the scaled right 2D image using parallel processing at a fixed calculation scale, wherein the calculation scale refers to a number of pixels configured to be matched at a same time;
calculate parallax values of the matched pixels; and
assign intensity levels to the depth map according to the calculated parallax values.

15. The non-transitory computer-readable medium according to claim 11, wherein the processor is caused by the executed computer programs to:
determine an effective measurable depth range of the intermediate depth map, wherein the effective measurable depth refers to a depth with a corresponding measurement resolution greater than or equal to a threshold; and
determine the second image resolution based on the effective measurable depth range of the intermediate depth map.

* * * * *